(12) United States Patent
Höck et al.

(10) Patent No.: US 6,431,337 B1
(45) Date of Patent: Aug. 13, 2002

(54) CONTROLLABLE COUPLING

(75) Inventors: Michael Höck, Neunkirchen-Seelscheid; Klaus Mätzschker, Neunkirchen, both of (DE)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/647,253

(22) PCT Filed: Jan. 13, 2000

(86) PCT No.: PCT/EP00/00197
§ 371 (c)(1),
(2), (4) Date: Sep. 22, 2000

(87) PCT Pub. No.: WO00/43691
PCT Pub. Date: Jul. 27, 2000

(30) Foreign Application Priority Data

Jan. 22, 1999 (DE) ......................... 199 02 388

(51) Int. Cl.$^7$ ..................... F16D 47/06; F16D 35/00
(52) U.S. Cl. .................. 192/48.3; 192/48.7; 192/57
(58) Field of Search .................. 192/35, 48.3, 48.7, 192/57, 58.41, 70.21, 84.6, 84.7, 70, 93 A

(56) References Cited

U.S. PATENT DOCUMENTS

| | | | | |
|---|---|---|---|---|
| 5,036,963 A | * | 8/1991 | Murata | 192/35 |
| 5,070,975 A | * | 12/1991 | Tanaka et al. | 192/35 |
| 5,890,573 A | * | 4/1999 | Kwoka | 192/35 |
| 6,092,633 A | * | 7/2000 | Morisawa | 192/35 |
| 6,102,178 A | * | 8/2000 | Walton | 192/35 |
| 6,182,808 B1 | * | 2/2001 | Walton et al. | 192/35 |

FOREIGN PATENT DOCUMENTS

| | | |
|---|---|---|
| DE | 424 978 | 2/1926 |
| DE | 36 09 419 | * 10/1986 |
| DE | 36 30 975 A1 | 3/1987 |
| DE | 196 50 039 A1 | 6/1997 |
| EP | 0 314 420 | 5/1989 |
| JP | 2-195031 | * 8/1990 |

* cited by examiner

Primary Examiner—Rodney H. Bonck

(57) ABSTRACT

A coupling for controllably transmitting torque, having a first coupling member and a second coupling member—especially a shaft and a coupling housing—which are supported so as to be rotatable relative to one another; the coupling comprises a friction coupling and a viscous coupling switched in parallel; the friction coupling comprises two sets of friction plates and the viscous coupling comprises two VC plate carriers; the sets of friction plates of the friction coupling are each connected in a rotationally fast way to the first and the second coupling member and axially loadable by an adjusting device, and a first VC plate carrier of the viscous coupling is permanently connected in a rotationally fast way to the first one of the coupling members, and a second VC plate carrier of the viscous coupling is disconnectably connected to the second coupling member, with an axial adjusting device connecting and disconnecting the second VC plate carrier of the viscous coupling in a friction locking way and closing and releasing the sets of friction plates of the friction coupling.

17 Claims, 8 Drawing Sheets

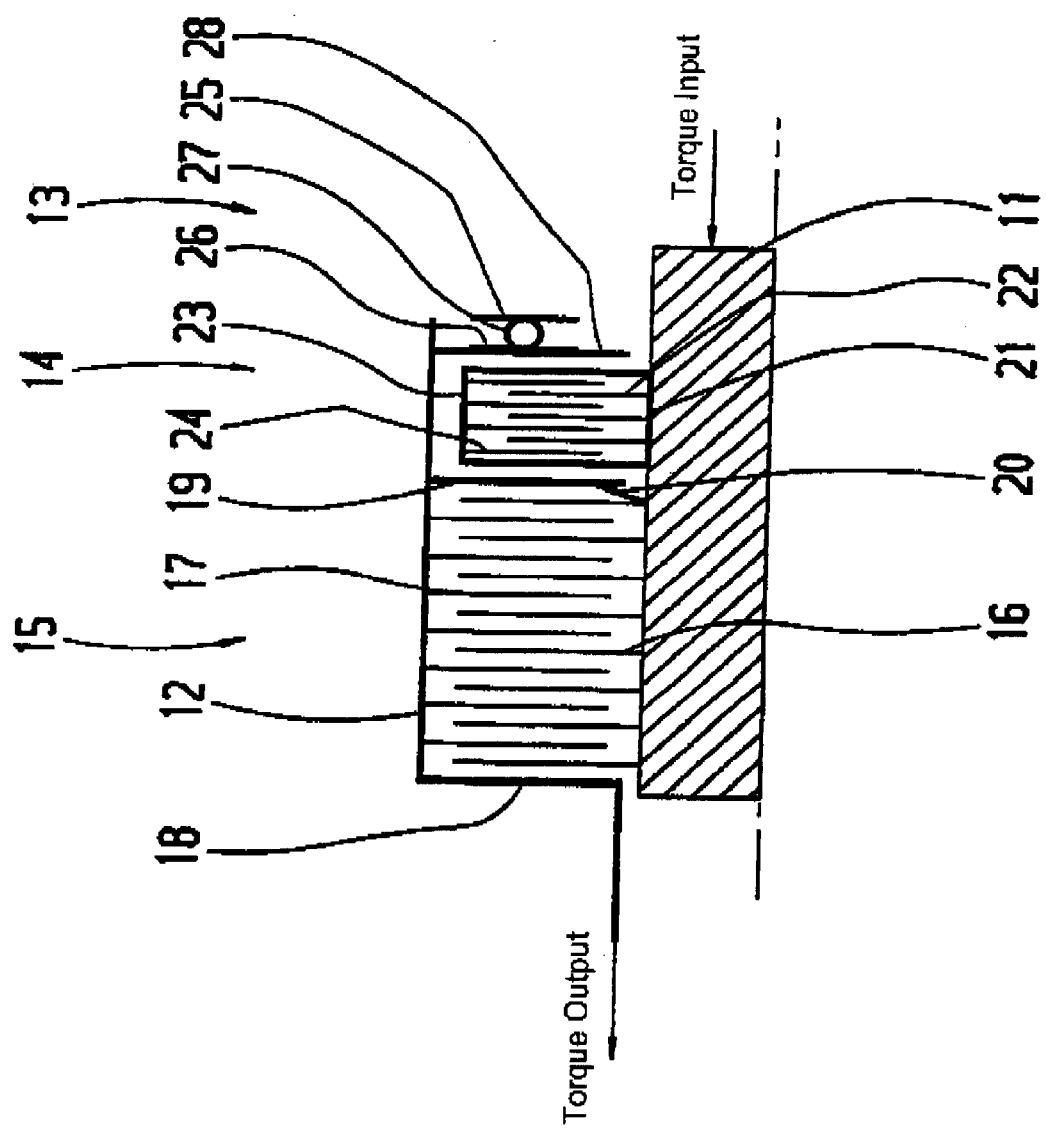

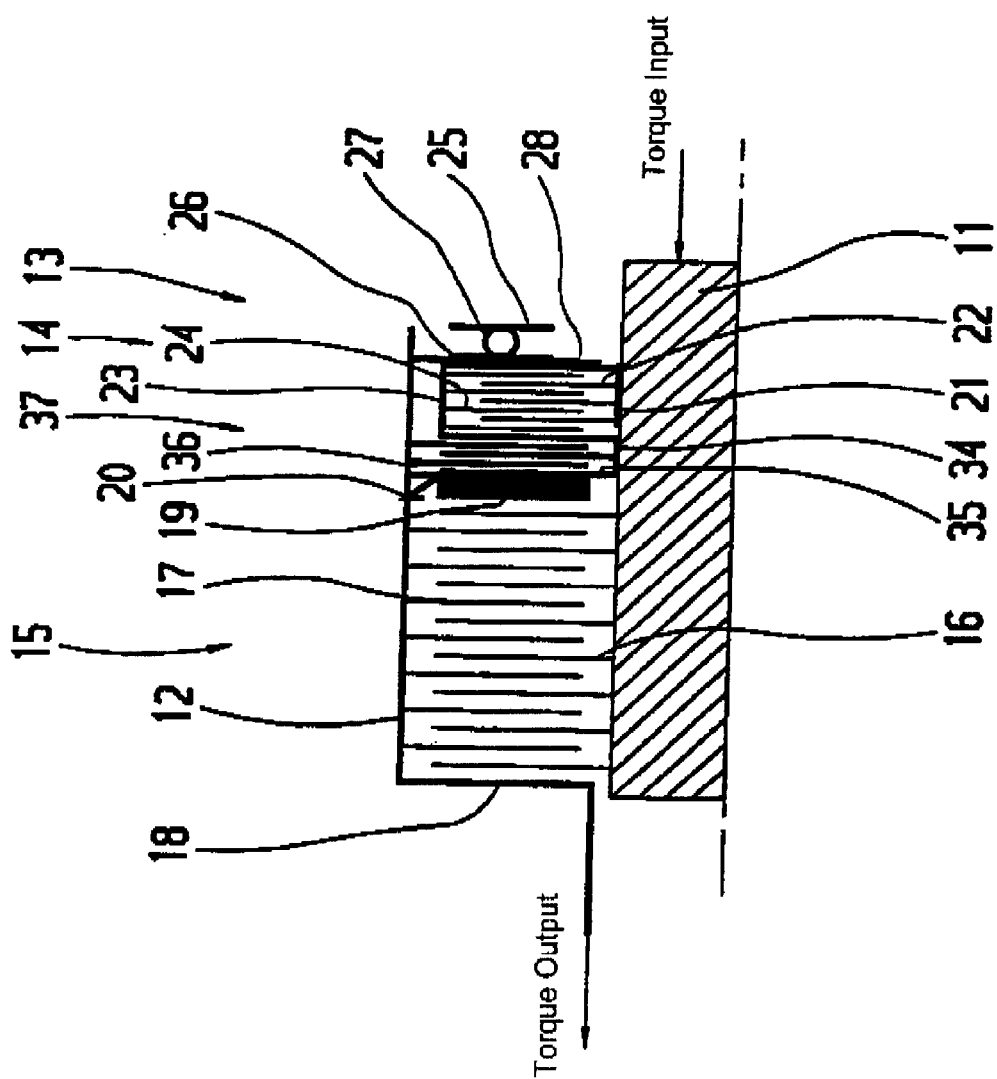

CONTROLLABLE COUPLING

BACKGROUND OF THE INVENTION

The invention relates to a coupling for controllably transmitting torque, and to a method of controlling said coupling. The coupling comprises a first coupling member and a second coupling member—especially a shaft and a coupling housing—which are supported so as to be rotatable relative to one another; the coupling comprises a friction coupling and a viscous coupling switched in parallel; the friction coupling comprises two sets of friction plates, the viscous coupling comprises two sets of VC plates respectively associated with one of two VC plate carriers. Couplings of the type described below are largely used as locks in differential drives of motor vehicles or as locks for connecting an additional drive axle in vehicle drives.

From DE 38 15 225 C2, there is known a differential drive with a friction coupling for which there has been proposed a particularly suitable, controllable variable speed drive.

A coupling which also serves to lock a differential drive and comprises a friction coupling and a viscous coupling switched in parallel is known from DE 34 26 460 C1, with said coupling being controlled automatically.

A further coupling of the above-mentioned type is known from DE-OS 22 09 879. However, in this case, the viscous coupling is not provided in the form of a multi-plate coupling.

Further couplings used for the above applications are described in EP 0 314 420, WO 86/02133 A1, U.S. Pat. Nos. 4,031,780, 4,058,027 and finally JP 1-72415 U and JP 63-312235 A.

SUMMARY OF THE INVENTION

It is an object of the present invention to provide a coupling of said type which can be controlled particularly well, and a method of controlling said coupling. The objective is achieved by providing a method of controlling a coupling for controllably transmitting torque. The coupling comprises a first coupling member and a second coupling member—especially a shaft and a coupling housing—which are supported so as to be rotatable relative to one another. The coupling comprises a friction coupling and a viscous coupling switched in parallel. The friction coupling comprises two sets of friction plates and the viscous coupling comprises two sets of VC plates respectively associated with one of two VC plate carriers. The method is characterized in that for disengaging the coupling, the sets of friction plates of the friction coupling are axially separated from one another and that one of the VC plate carriers of the viscous coupling is completely disconnected from one of the coupling members. In particular, it is proposed that for an increasing engagement of the coupling, first the one of the VC plate carriers of the viscous coupling is coupled with one of the coupling members in a friction locking way, whereas the other one of the VC plate carriers of the viscous coupling remains permanently connected in a rotationally fast way to the other one of the coupling members. Thereafter, the friction coupling is engaged, with the sets of friction plates of the friction coupling remaining permanently connected in a rotationally fast way with one of the two coupling members.

In another aspect, a coupling for controllably transmitting torque, having a first coupling member and a second coupling member—especially a shaft and a coupling housing—which are supported so as to be rotatable relative to one another is provided. The coupling comprises a friction coupling and a viscous coupling switched in parallel. The friction coupling comprises two sets of friction plates and the viscous coupling comprises two sets of VC plates each associated with one of two VC plate carriers. The sets of friction plates of the friction coupling are respectively connected in a rotationally fast way to the first and the second coupling member and axially loadable by an adjusting device. A first VC plate carrier of the viscous coupling is permanently connected in a rotationally fast way to the first one of the coupling members, and a second VC plate carrier of the viscous coupling is disconnectably connected to the second coupling member. The device also includes an adjusting device for axial adjustment connecting and disconnecting the second VC plate carrier of the viscous coupling in a friction locking way and closing and releasing the sets of friction plates of the friction coupling.

The inventive coupling combines the high torque transmitting capacity of a friction coupling with the extremely sensitive reaction behavior of a viscous coupling. In addition, in spite of the speed differential between the coupling members, the coupling has the characteristic of being completely separatable by disconnecting the viscous coupling.

The viscous coupling needs to transmit a relatively low torque only and does not require a hump function. The control behavior is improved as a result of the delay-free and self-controlling function of the viscous coupling.

To the extent that the coupling housing of the viscous coupling is used in some of the following embodiments in the function of a coupling plate, the housing has to be correspondingly robust.

According to an alternative, it is possible for a plate carrier to be connected to the coupling housing, with friction plates on said plate carrier, together with friction plates held in the second coupling member, forming a separate auxiliary friction coupling for connecting the viscous coupling housing.

It is proposed that preferred axial adjusting devices are those initially mentioned in DE 38 15 225 C2. These can optionally be provided with two or three ramp discs. In an embodiment with two ramp discs, one of the discs is held axially and the other one of the discs is axially spread apart if the two discs rotate relative to one another. In the embodiment with three ramp discs, the middle one can be held axially and if the discs rotate relative to one another and especially if the middle disc rotates, the two outer ramp discs, especially via different ranges of rotational angles, can be spread apart from said middle disc one after the other.

The ramp discs are preferably supported relative to one another by three balls held in pairs of grooves.

The rotatable ramp discs are adjusted by an electric motor which, when stopping, is braked by a spring-loaded brake plate package. When the motor is switched on for adjusting purposes, a magnet first releases the brake plate package.

Other objects and advantages of the invention will become apparent upon reading the following detailed description and appended claims and upon reference to the accompanying drawings.

BRIEF DESCRIPTION OF THE DRAWINGS

Preferred embodiments of the inventive coupling will be described and explained below with reference to the drawings wherein FIGS. 1a and 1b show a coupling in a first embodiment with an axially displaceable viscous coupling housing.

a) showing the design principle, b) showing the design principle in further detail.

Figure 2B:
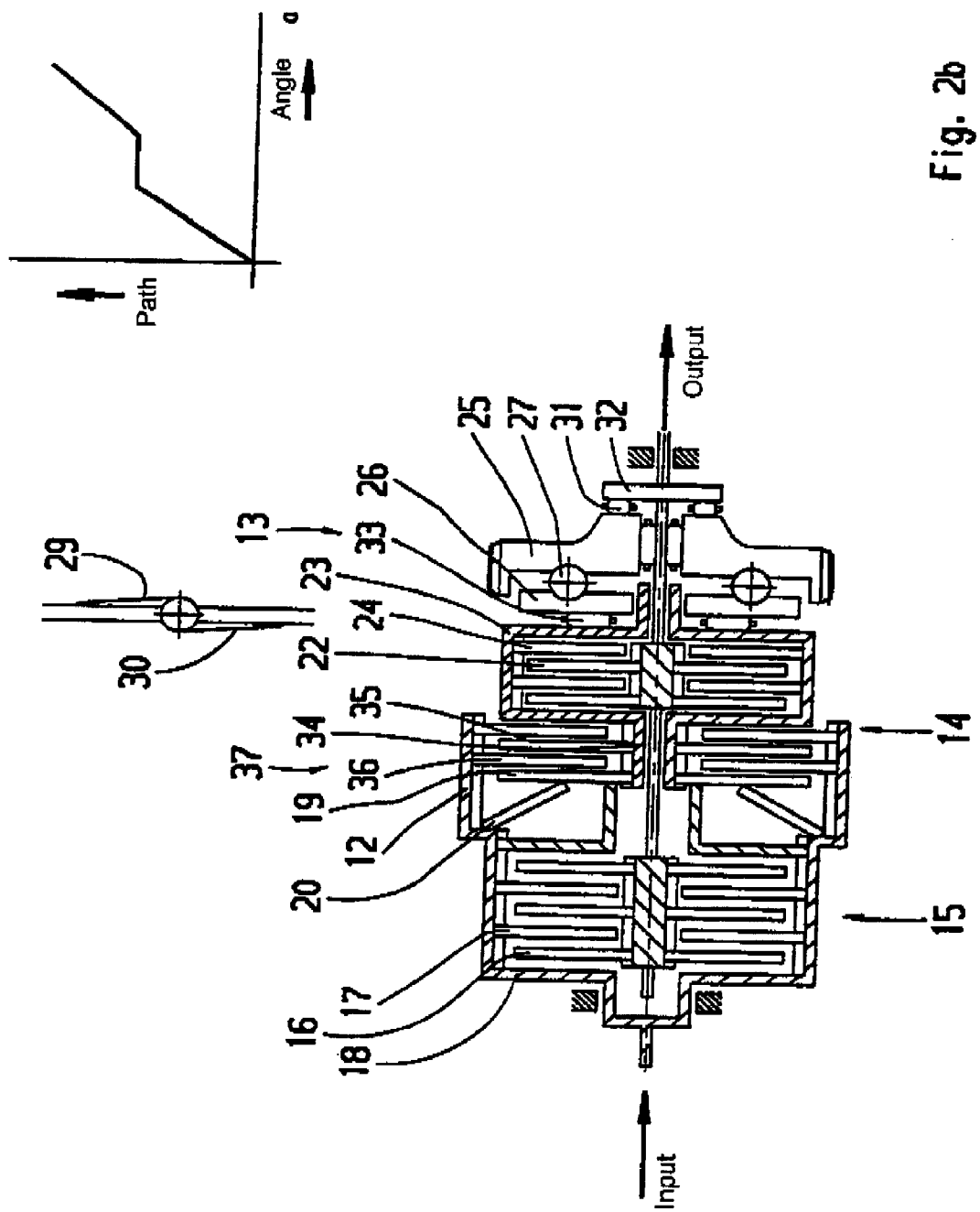

FIGS. 2a and 2b show a coupling in a second embodiment with an axially displaceable viscous coupling housing and a subsequent plate carrier.

a) showing the design principle in half a section, b) showing the design principle in further detail.

Figure 3A:
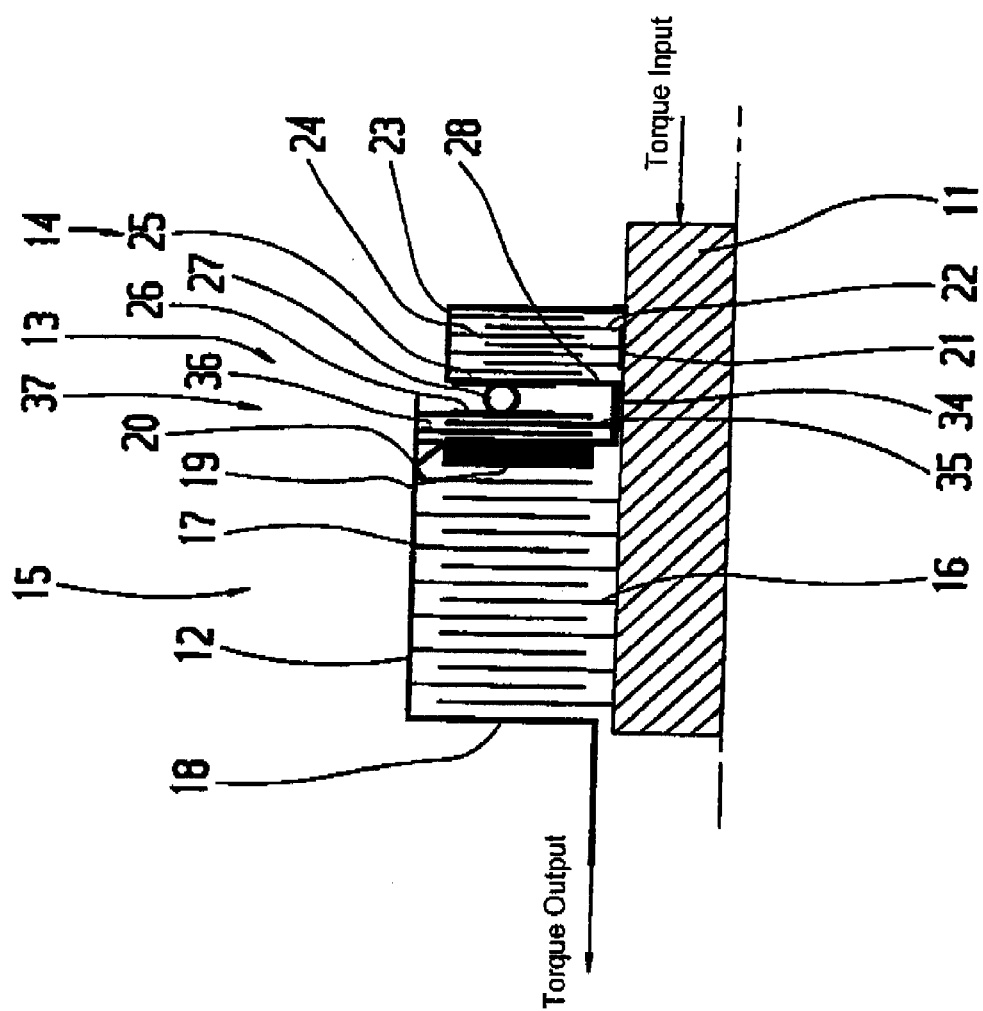
Figure 3B:
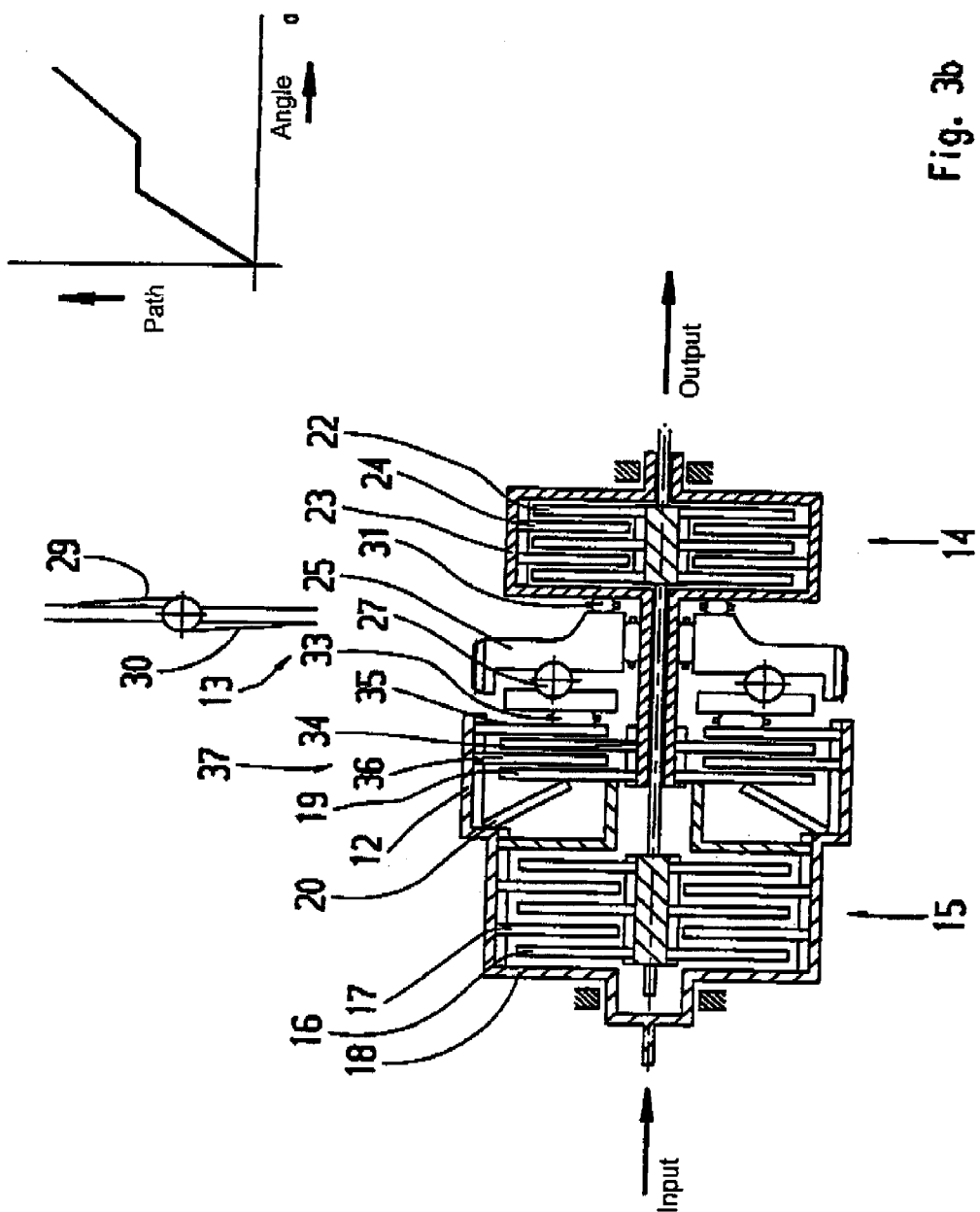

FIGS. 3a and 3b show a coupling with a firmly supported viscous coupling housing in a first embodiment, a) showing the design principle in half a section, b) showing the design principle in further detail.

Figure 4A:
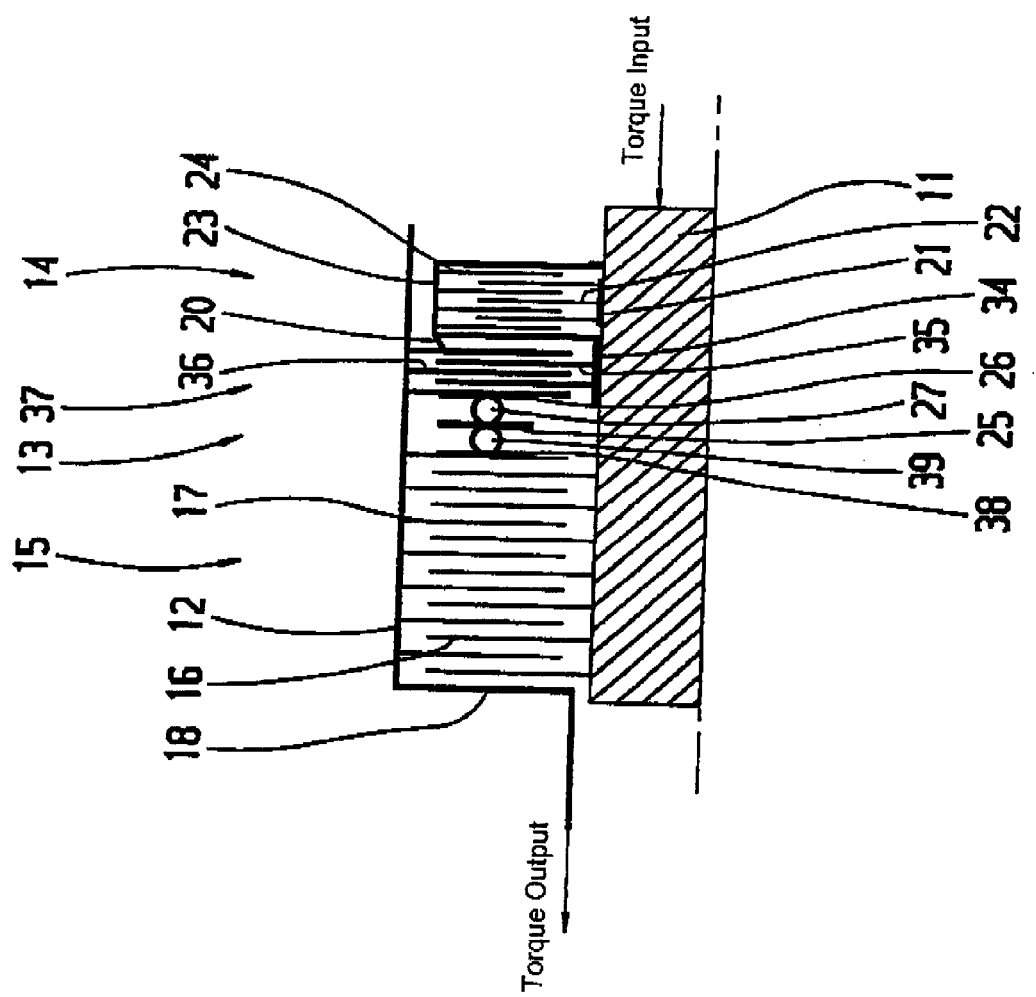
Figure 4B:
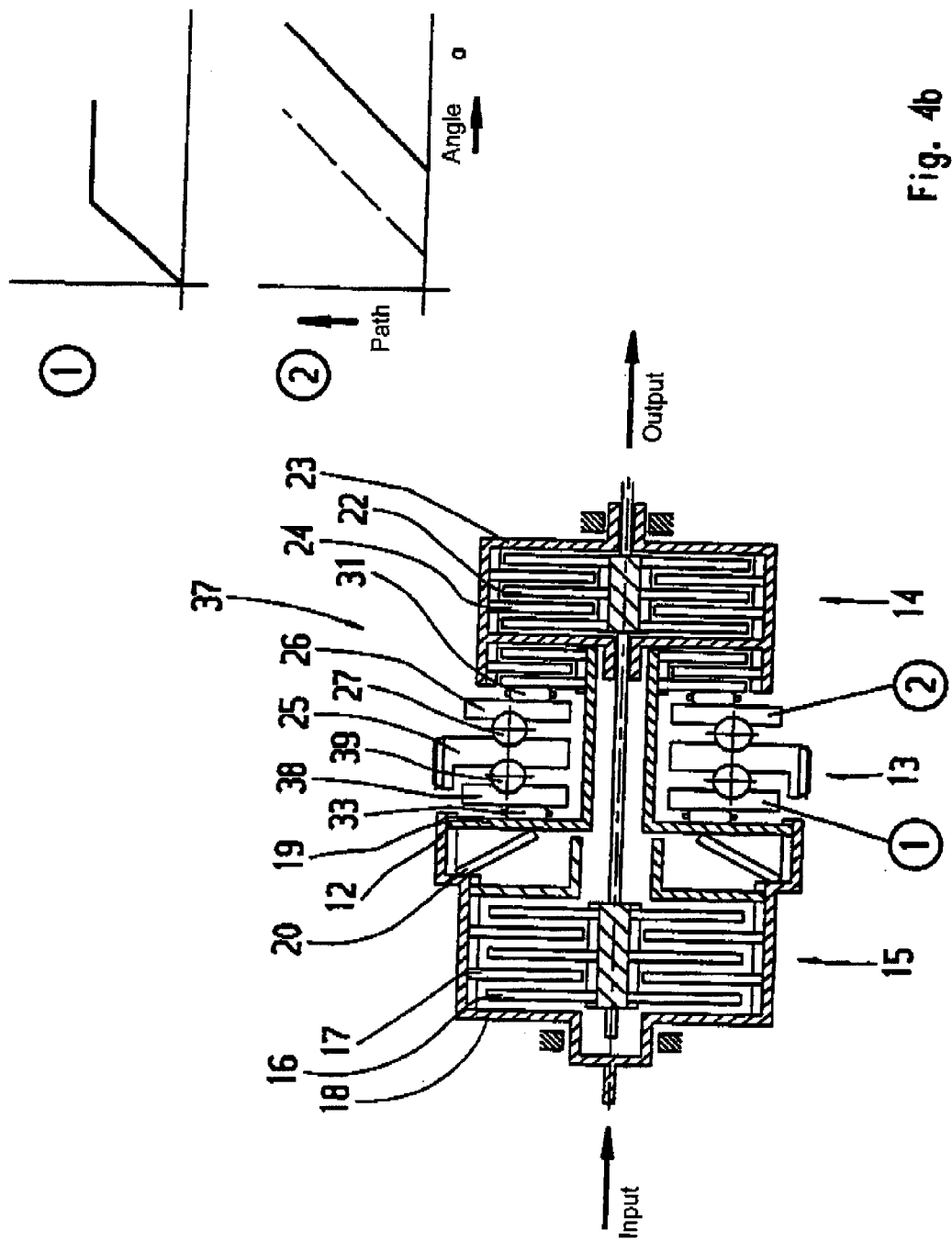

FIGS. 4a and 4b show the coupling with an axially supported viscous coupling housing in a second embodiment, a) showing the design principle in half a section b) showing the design principle in further detail.

DETAILED DESCRIPTION OF THE INVENTION

FIG. 1a shows a driveshaft 11 in the form of a first coupling member and a coupling housing 12 in the form of a second coupling member. An axial adjusting assembly 13, a viscous coupling 14 and a friction coupling 15 can be seen to be axially arranged one behind the other. Inner friction plates 16 of the friction coupling are directly connected to the shaft in a rotationally fast way. Outer friction plates 17 of the friction coupling are directly connected to the housing 12 in a rotationally fast way. The two sets of plates can be supported on a radial wall 18 of the housing. A first friction plate 19 is supported on a plate spring 20. The viscous coupling shows an inner plate carrier 21 with inner VC plates 22 which are rotationally fast relative to the shaft 11. Furthermore, it is possible to see the viscous coupling housing 23 which serves as a plate carrier for outer VC plates 24. The coupling housing 23 is axially displaceable. The adjusting device 13 shows two ramp discs 25, 26 between which there are arranged balls 27. The ramp disc is axially supported. The ramp disc 26 acts axially via the pressure disc 28 on the housing 23 of the viscous coupling, which housing 23, when loaded, first rests against the friction plate 19 which is resiliently supported. In this way, the viscous coupling housing 23 is coupled to the housing 12. In the course of further adjustment, the friction coupling 15 closes.

Figure 1B:
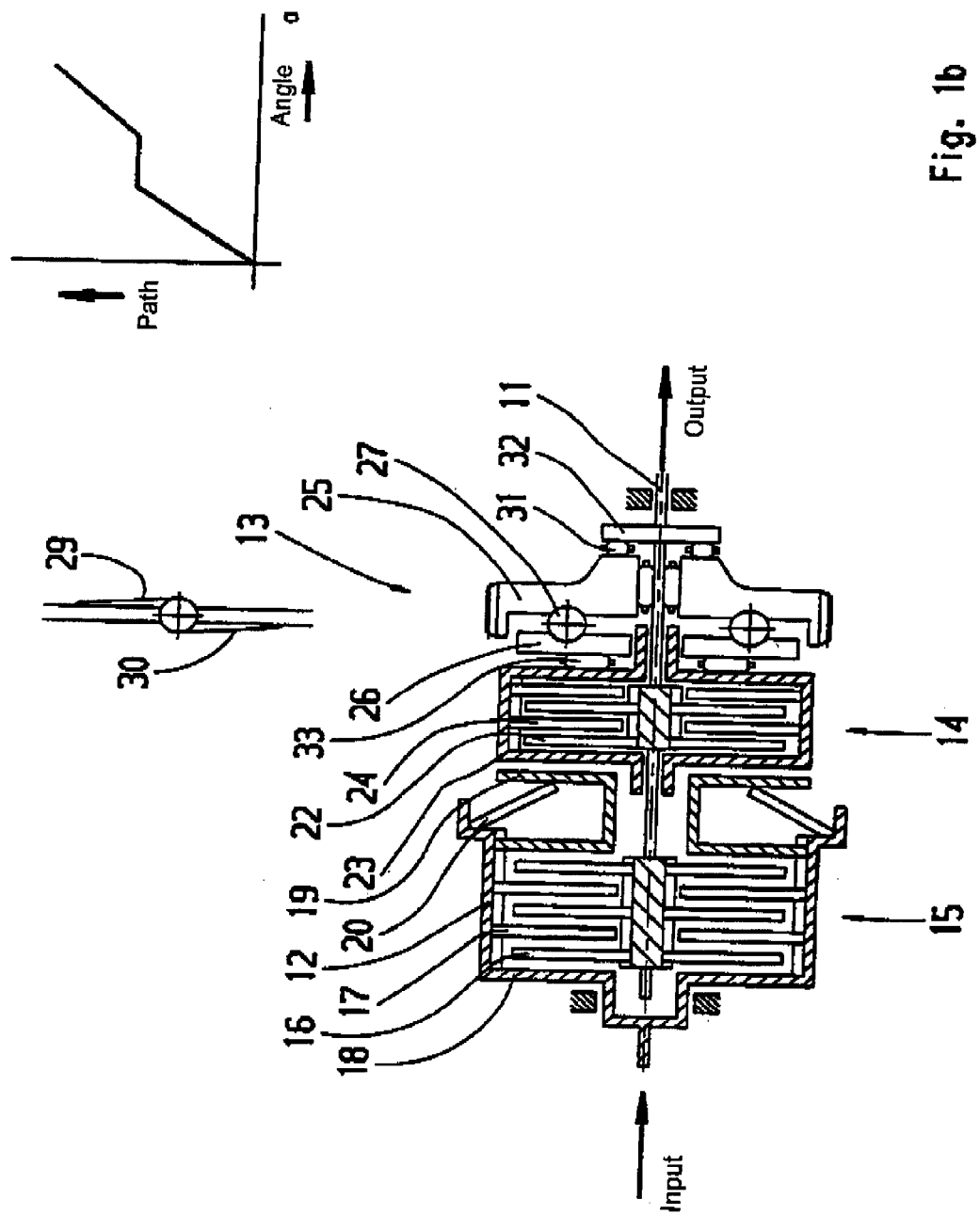

Any details in FIG. 1b which correspond to those in FIG. 1a have been given the same reference numbers. In one detail, the circumferential course taken by the ball grooves 29, 30 is shown at the ramp discs. The ramp disc 25 is supported via an axial bearing 31 on a shaft step 32 of the shaft 11, with the ramp disc 26 being supported via an axial bearing 33 on the viscous coupling housing 23. In a diagram, the axial path of the ramp disc 26 is shown as a function of the angle of rotation of the ramp disc 25 which initially serves to connect the viscous coupling and subsequently to close the viscous coupling.

FIG. 2a shows a driveshaft 11 in the form of a first coupling member and a coupling housing 12 in the form of a second coupling member. An axial adjusting assembly 13, a viscous coupling 14 and a friction coupling 15 can be seen to be axially arranged one behind the other. Inner friction plates 16 of the friction coupling are directly connected to the shaft in a rotationally fast way. Outer friction plates 17 of the friction coupling are directly connected to the housing 12 in a rotationally fast way. The two sets of plates can be supported on a radial wall 18 of the housing. A first friction plate 19 is supported on a plate spring 20. The viscous coupling shows an inner plate carrier 21 with inner VC plates 22 which are rotationally fast relative to the shaft 11. Furthermore, it is possible to see the viscous coupling housing 23 which serves as a plate carrier for outer VC plates 24. The coupling housing 23 is axially displaceable. At the viscous coupling housing 23, there is arranged an additional plate carrier 34 which carries inner friction plates 35 co-operating with outer friction plates 36 which are directly held in the housing 12 in a rotationally fast way. Said friction plates form an auxiliary coupling 37 for connecting the viscous coupling housing 23 at the housing 12. The adjusting device 13 shows two ramp discs 25, 26 between which there are arranged balls 27. The ramp disc 25 is axially supported. The ramp disc 26 acts axially via the pressure disc 28 on the housing 23 of the viscous coupling and on the auxiliary coupling 37 which when loaded, first rest against the friction plate 19 which is resiliently supported. In this way, the viscous coupling housing 23 is connected to the housing 12. In the course of further adjustment, the friction coupling 15 closes.

Any details in FIG. 2b which correspond to those in FIG. 1a have been given the same reference numbers. In one detail, the circumferential course taken by the ball grooves 29, 30 is shown at the ramp discs. The ramp disc 25 is supported via an axial bearing 31 on a shaft step 32 of the shaft 11, with the ramp disc 26 being supported via an axial bearing 33 on the viscous coupling housing 23. In a diagram, the axial path of the ramp disc 26 is shown as a function of the angle of rotation of the ramp disc 25 which initially serves to connect the viscous coupling and subsequently to close the viscous coupling.

FIG. 3a shows a driveshaft 11 in the form of a first coupling member and a coupling housing 12 in the form of a second coupling member. A viscous coupling, an axial adjusting assembly 13 and a friction coupling 15 can be seen to be axially arranged one behind the other. Inner friction plates 16 of the friction coupling are directly connected to the shaft in a rotationally fast way. Outer friction plates 17 of the friction coupling are directly connected to the housing 12 in a rotationally fast way. The two sets of plates can be supported on a radial wall 18 of the housing. A first friction plate 19 is supported on a plate spring 20. The viscous coupling shows an inner plate carrier 21 with inner VC plates 22 which are rotationally fast relative to the shaft 11. Furthermore, it is possible to see the viscous coupling housing 23 which serves as a plate carrier for outer VC plates 24. The coupling housing 23 is axially supported. At the viscous coupling housing 23, there is arranged an additional plate carrier 34 carrying inner friction plates 35 which co-operate with outer friction plates 36 held directly in the housing 12 in a rotationally fast way. Said friction plates form an auxiliary friction coupling 37 for connecting the viscous coupling housing 23 to the housing 12. The adjusting device 13 shows two ramp discs 25, 26 between which there are arranged balls 27. The ramp disc 25 is axially supported. The ramp disc 26 acts axially via the pressure disc 28 on the auxiliary coupling 37 at housing 23 of the viscous coupling, which auxiliary coupling 37, when loaded, first rests against the friction plate 19 which is resiliently supported. In this way, the viscous coupling housing 23 is connected to the housing 12. In the course of further adjustment, the friction coupling 15 closes.

Any details in FIG. 3b which correspond to those in FIG. 1a have been given the same reference numbers. In one detail, the circumferential course taken by the ball grooves 29, 30 is shown at the ramp discs. The ramp disc 25 is supported via an axial bearing 31 on a shaft step 32 of the shaft 11, with the ramp disc 26 being supported via an axial bearing 33 on the viscous coupling housing 23. In a diagram, the axial path of the ramp disc 26 is shown as a function of the angle of rotation of the ramp disc 25, which initially serves to connect the viscous coupling and subsequently to close the viscous coupling.

FIG. 4a shows a driveshaft 11 in the form of a first coupling member and a coupling housing 12 in the form of a second coupling member. A viscous coupling, an axial adjusting assembly 13 and a friction coupling 15 can be seen to be axially arranged one behind the other. Inner friction plates 16 of the friction coupling are directly connected to the shaft in a rotationally fast way. Outer friction plates 17 of the friction coupling are directly connected to the housing 12 in a rotationally fast way. The two sets of plates can be supported on a radial wall 18 of the housing. A first friction plate 19 is supported on a plate spring 20. The viscous coupling shows an inner plate carrier 21 with inner VC plates 22 which are rotationally fast relative to the shaft 11. Furthermore, it is possible to see the viscous coupling housing 23 which serves as a plate carrier for outer VC plates 24. The coupling housing 23 is axially supported. At the viscous coupling housing 23, there is arranged an additional plate carrier 34 carrying inner friction plates 35 which co-operate with outer friction plates 36 held directly in the housing 12 in a rotationally fast way. Said friction plates form an auxiliary friction coupling 37 for connecting the viscous coupling housing 23 to the housing 12. The adjusting device 13 shows two ramp discs 25, 26 between which there are arranged balls 27, 39. The ramp disc 25 is axially supported. The ramp disc 26 acts axially via the pressure disc 28 on the auxiliary coupling 37 at housing 23 of the viscous coupling, which auxiliary coupling 37, when loaded, first rests against the friction plate 19 which is resiliently supported. In this way, the viscous coupling housing 23 is connected to the housing 12. In the course of further adjustment, the ramp disc 38 acts on the sets of friction plates of the friction coupling, as a result of which the friction coupling 15 closes.

Any details in FIG. 4b which correspond to those in FIG. 1a have been given the same reference numbers. In one detail, the circumferential course taken by the ball grooves 29, 30 is shown at the ramp discs. The ramp disc 25 is supported via an axial bearing 31 on a shaft step 32 of the shaft 11, with the ramp disc 26 being supported via an axial bearing 33 on the viscous coupling housing 23. In the diagrams, the axial path of the ramp discs 26 and 38 is shown as a function of the angle of rotation of the ramp disc 25, which in this case, too, initially serves to connect the viscous coupling and subsequently to close the viscous coupling.

What is claimed is:

1. A method of controlling a coupling for controllably transmitting torque, wherein the coupling comprises a first coupling member and a second coupling member which are supported so as to be rotatable relative to one another, the coupling comprising a friction coupling and a viscous coupling functionally arranged in parallel between said first coupling member and said second coupling member, the friction coupling comprising two sets of friction plates, said sets of friction plates respectively connected in a rotationally fast way to said first and second coupling members, and the viscous coupling comprising two sets of VC plates, said sets of VC plates respectively associated with one of two VC plate carriers, the method comprising the steps of:

for disengaging the coupling, axially separating the sets of action plates of the friction coupling from one another, and completely disconnecting one of the VC plate carriers of the viscous coupling from one of the coupling members; and for increasingly engaging the coupling, connecting in a friction locking way, one of the VC plate carriers of the viscous coupling with one of the coupling members, with the other one of the VC plate carriers of the viscous coupling remaining permanently connected in a rotationally fast way to the other one of the coupling members, and thereafter, increasingly engaging the friction coupling with the sets of friction plates of the friction coupling being permanently connected in a rotationally fast way with one of the two coupling members respectively.

2. A coupling for controllably transmitting torque, having a first coupling member and a second coupling member which are supported so as to be rotatable relative to one another, the coupling comprising:

a friction coupling and a viscous coupling functionally arranged in parallel between said first and second coupling members, wherein the friction coupling comprises two sets of friction plates, said sets of friction plates respectively connected in a rotationally fast way to said first and second coupling members, and the viscous coupling comprises two sets of VC plates, said sets of VC plates respectively associated with one of two VC plate carriers, and wherein the sets of friction plates of the friction coupling are axially loadable by an axial setting device for closing and releasing the sets of friction plates of the friction coupling, and a first VC plate carrier of the viscous coupling is permanently connected in a rotationally fast way to the first coupling member, and a second VC plate carrier of the viscous coupling is disengagably connected to the second coupling member, with the axial setting device for connecting and disconnecting, in a friction locking way, the second VC plate carrier of the viscous coupling.

3. A coupling according to claim 2, wherein the viscous coupling comprises a separate viscous coupling housing which forms the connectable and disconnectable VC plate carrier.

4. A coupling according to claim 3, wherein radial walls of the viscous coupling housing co-operate with outer friction plates connected to the second coupling member for connecting the viscous coupling housing to the second coupling member.

5. A coupling according to claim 3, wherein a plate carrier with inner friction plates is connected to the viscous coupling housing which inner friction plates cooperate with outer friction plates held in the second coupling member for connecting the viscous coupling housing to the second coupling member.

6. A coupling according to claim 3, wherein at least the viscous coupling housing of the viscous coupling is arranged axially displaceably and is located between the axial setting device and the friction coupling and that between the viscous coupling housing of the viscous coupling and the sets of friction plates of the friction coupling there is provided a resiliently supported friction plate which is biased against the effect of the axial setting device.

7. A coupling according to claim 3, wherein the viscous coupling housing of the viscous coupling and the friction plates for connecting the viscous coupling housing to the second coupling member are arranged between the axial setting device and the sets of friction plates of the friction coupling and that between the friction plates for connecting the viscous coupling housing to the second coupling member and the sets of friction plates of the friction coupling there is provided a resiliently supported friction plate which is biased against the effect of the axial setting device.

8. A coupling according to claim 3, wherein the viscous coupling housing of the viscous coupling is axially firmly supported and that the axial setting device is arranged between the viscous coupling housing of the viscous coupling and the friction plates for the purpose of connecting the viscous coupling housing to the second coupling member and that between the friction plates for connecting the viscous coupling housing to the second coupling member and the sets of friction plates of the friction coupling there is arranged a resiliently supported friction plate which is biased against the effect of the adjusting device.

9. A coupling according to claim 3, wherein the viscous coupling housing of the viscous coupling is axially firmly supported and that the axial setting device is arranged between the friction plates for connecting the viscous coupling housing to the second coupling member and the sets of friction plates of the friction coupling.

10. A coupling for controllably transmitting torque, having a first coupling member and a second coupling member which are supported so as to be rotatable relative to one another, the coupling comprising:

a friction coupling and a viscous coupling functionally arranged in parallel between said first and second coupling members, wherein the friction coupling comprises two sets of friction plates, said sets of friction plates respectively connected in a rotationally fast way to said first and second coupling members, and the viscous coupling comprises two sets of VC plates, said sets of VC plates respectively associated with one of two VC plate carriers, and wherein the sets of friction plates of the friction coupling are axially loadable by an axial setting device for closing and releasing the sets of friction plates of the friction coupling and a first VC plate carrier of the viscous coupling is permanently connected in a rotationally fast way to the first coupling member, and a second VC plate carrier of the viscous coupling is disengagably connected to the second coupling member, with the axial setting device for connecting and disconnecting, in a friction locking way, the second VC plate carrier of the viscous coupling wherein the adjusting device comprises two standing/non-rotating ramp discs which are rotatable relative to one another by a limited angle of rotation and which are either directly or indirectly supported on one another and which, when rotating relative to one another, are axially spread apart from one another.

11. A coupling according to claim 10, wherein the ramp discs are supported relative to one another by at least three balls held in pairs of ball grooves of variable depth in faces of the ramp discs.

12. A coupling according to claim 10, wherein the spread of the ramp disc acting on the connection of the viscous coupling housing to the second coupling member is effected at an initial angle of rotation, whereas the spread of the ramp disc acting on the friction coupling is effected at a subsequent angle of rotation.

13. A coupling for controllably transmitting torque, having a first coupling member and a second coupling member which are supported so as to be rotatable relative to one another, the coupling comprising:

a friction coupling and a viscous coupling functionally arranged in parallel between said first and second coupling members, wherein the friction coupling comprises two sets of friction plates, said sets of friction plates respectively connected in a rotationally fast way to said first and second coupling members, and the viscous coupling comprises two sets of VC plates, said sets of VC plates respectively associated with one of two VC plate carriers, and wherein the sets of friction plates of the friction coupling are axially loadable by an axial setting device for closing and releasing the sets of friction plates of the friction coupling, and a first VC plate carrier of the viscous coupling is permanently connected in a rotationally fast way to the first coupling member, and a second VC plate carrier of the viscous coupling is disengagably connected to the second coupling member, with the axial setting device for connecting and disconnecting, in a friction locking way, the second VC plate carrier of the viscous coupling wherein the adjusting device comprises three standing/non-rotating ramp discs which are rotatable relative to one another by a limited angle of rotation and which are either indirectly or directly supported on one another and which, when rotating relative to one another, are axially spread apart from one another.

14. A coupling according to claim 13, wherein the middle one of the three ramp discs is rotatable.

15. A coupling according to claim 13, wherein of the three ramp discs, the middle one is held axially fixed.

16. A coupling according to claim 13, wherein the ramp discs are supported relative to one another by at least three balls held in pairs of ball grooves of variable depth in faces of the ramp discs.

17. A coupling according to claim 13, wherein the spread of the ramp disc acting on the connection of the viscous coupling housing to the second coupling member is effected at an initial angle of rotation, whereas the spread of the ramp disc acting on the friction coupling is effected at a subsequent angle of rotation.

* * * * *